Patented Sept. 22, 1936

2,055,391

UNITED STATES PATENT OFFICE 2,055,391

PROCESS OF PREPARING ACETALS

Werner Starck, Hofheim, Germany, assignor to I. G. Farbenindustrie Aktiengesellschaft, Frankfort-on-the-Main, Germany No Drawing. Application February 6, 1935, Serial No. 5,304. In Germany February 17, 1934

17 Claims. (Cl. 260—151)

The present invention relates to a process of preparing acetals.

There are known processes for making acetals of polyvinyl alcohol and expedients for overcoming certain difficulties attending the operations. A main difficulty is the isolation of the acetals from the highly viscous solutions produced during the preparation of the acetals and containing electrolytes, so that the acetals cannot be obtained in that degree of purity and freedom from electrolytes necessary for the purposes for which the polyvinyl acetals are used.

If a raised temperature is applied in order to eliminate the solvents from the solutions of the polyvinyl acetals, the acetals are obtained at the moment when they precipitate from the solutions in a more or less soft, plastic, very viscous form which can be kneaded only with difficulty owing to the high degree of polymerization. It is very difficult to treat the mass further in this condition, particularly to wash it in order to eliminate the electrolytes.

Now I have found that the polyvinyl acetals can be readily obtained in a condition in which they can well be further treated by dissolving them in substances which are liquid under a raised pressure and in this condition act as a solvent of the acetal and which are gaseous under ordinary pressure and at ordinary temperature or, in other words, substances which are so volatile that at ordinary temperature and under ordinary pressure they are already a gas or become a gas, but liquify at ordinary temperature, under increased pressure and, in this condition, are solvents of the polyvinyl acetals; the solution may be released from the pressure vessel, preferably through a nozzle into water or another non-solvent. The volatile solvent evaporates very rapidly even in the cold and the polymerization product is obtained in a loose, and finely divided form in which it is practically free from adhering monomeric compounds and can be obtained in a pure condition by washing and drying it. Substances of this volatile nature suitable for the preparation of the acetal solution are, for instance, methyl chloride, ethyl chloride, dimethyl ether, ethylene oxide and similar bodies which owing to their content of halogen or oxygen have strong solvent properties; furthermore, sulfur dioxide and others.

The acetals of polyvinyl alcohol may be prepared by the hitherto known methods, i. e. by causing the carbonyl compound (acetaldehyde, formaldehyde, ketone) with or without the addition of a diluent or a solvent, such as water, alcohol, to act upon polyvinyl alcohol, and the invention may be applied to the finished acetal by dissolving the acetal in the substance which is liquid under pressure. If the acetal is, for instance, prepared by a direct action of the aldehyde on the polyvinyl alcohol, in the presence of a catalyst, the reaction product formed is directly dissolved in one of the solvents to be used (which is gaseous at ordinary temperature), while applying pressure; the solution obtained is then forced by the said pressure for instance into a precipitating bath. A suitable precipitating bath is water; but, if desired, another agent, for instance alcohol or alcohol diluted with water may be used for the precipitation. It is essential that this agent is a non-solvent from which the acetal separates while the solvent, which volatilizes immediately after the release, escapes. During this separation the reaction product assumes a very finely divided, flocculent or powdery form; it can be very readily washed and thus freed from adhering constituents, particularly from the catalyst. If the acetal has been prepared by the action of aldehyde on polyvinyl alcohol in the presence of a normal solvent, it is advisable first to eliminate the solvent (by a distillation under reduced pressure or a steam distillation) then to dissolve the residue in the readily volatile solvent which is to be used according to the invention and finally to isolate the acetal from this solvent in the manner already described.

Alternatively, the acetal may also be produced in one of the readily volatile solvents. A second dissolution is thus saved, the directly obtained solution being allowed to escape into the precipitating bath. In this case the acetal is made in a pressure vessel. On the release of the solution obtained the solvent is very rapidly transformed into the gaseous state, and the acetal is obtained in a very finely divided form. The solution may be released without a precipitating bath, or it may be forced into such a bath.

Sulfur dioxide is particularly suitable for use in the invention, because it is a good solvent, can readily be liquefied by pressure and yet is readily volatile at ordinary temperature; when the acetal is prepared in the liquid sulfur dioxide there is the further advantage that the sulfur dioxide acts during the formation of the acetal not only as a solvent but also as a catalyst, most probably in the form of sulfurous acid which is produced in the polyvinyl alcohol owing to small quantities of moisture. At the same time the sulfur dioxide binds the water which is formed in the reaction.

Thus when the sulfur dioxide is used the catalyst which is necessary for the formation of the acetal—small quantities of a strong acid—may in most cases be omitted; this is a new technical effect of the present process, for the acetal is obtained directly in a form free from the noxious electrolytes so that a complicated washing process for removing these is not necessary.

The invention constitutes a remarkable progress in the art. The acetals may be made directly from polyvinyl ester instead of from polyvinyl alcohol, saponification and formation of the acetal occurring in one operation. All organic compounds having carbonyl capable of reacting are available for making polyvinyl acetals, such as aldehydes or bodies capable of forming aldehydes, also ketones, particularly hydroaromatic ketones.

The following examples serve to illustrate the invention, but they are not intended to limit it thereto, the parts being by weight.

(1) 200 parts of a formaldehyde-acetal of polyvinyl alcohol, prepared by the reaction of polyvinyl acetate and formaldehyde in the presence of ethyl alcohol, and traces of sulfuric acid as a catalyst, are precipitated with water and dried. The substance is obtained in the form of grains and still contains traces of sulfuric acid which makes it useless for various purposes. In order to obtain the substance in unobjectionable condition 200 parts of the polyvinyl alcohol formaldehyde acetal are dissolved at 40° C., while stirring, in a closed vessel in 800 parts of sulfur dioxide. The solution is then released into 20 times its volume of water of room temperature. During this operation the sulfur dioxide serving as a solvent is momentarily evolved in the form of gas. The acetal is precipitated in fine flakes which after a further washing are dried. The polyvinyl formaldehyde acetal is thus obtained in a completely pure condition.

(2) 500 parts of an acetaldehyde-acetal made from highly viscous polyvinyl alcohol by the reaction of an aqueous solution of polyvinyl alcohol with acetaldehyde and traces of hydrochloric acid as catalyst are dried and then dissolved, in order to further purify them, at 40° C., in a pressure vessel in 3000 parts of sulfur dioxide. This solution is released into 20 times its volume of water of room temperature. The product is precipitated in fine flakes which can readily be washed.

(3) 500 parts of a butyraldehyde-acetal from polyvinyl alcohol prepared by the reaction of polyvinyl alcohol in ethanol with butyraldehyde in the presence of traces of sulfuric acid as catalyst are worked up by blowing off the solvent with steam and drying under reduced pressure; they are then dissolved in a pressure vessel in 2000 parts of methyl chloride. The solution is released into water at room temperature. During this operation the polymeric acetal is precipitated in a finely divided form which can readily be washed. After drying under reduced pressure, there is obtained a white, fibrous mass which is free from portions of low molecular weight.

(4) 1000 parts of polyvinyl alcohol, 5 parts of concentrated hydrochloric acid, 850 parts of butyraldehyde and 5000 parts of dimethyl ether are placed in a bomb having a stirrer and heated for 40 hours to 45° C. The solution of the reaction product is then released into water; by this operation the polymeric acetal is precipitated in the form of a fine powder which is well washed with water and dried under reduced pressure. The product is now completely free from acid.

It is already somewhat plastic at ordinary temperature; the plasticity increases at raised temperatures; but then the product is not sufficiently soft to be washed sufficiently by stirring, kneading or rolling and thus be freed from the electrolytes.

If, instead of butyraldehyde, the equivalent quantity of octoicaldehyde is used there is obtained an acetal which is considerably more plastic than the butyraldehyde acetal and can be freed still less readily by known processes from the catalyst (hydrochloric acid).

If sulfur dioxide is used as a solvent instead of the dimethyl ether an addition of hydrochloric acid is not necessary so that the final product which is free from the electrolyte can be made still more readily.

(5) Into a pressure bomb there are introduced 1000 parts of polyvinyl alcohol and 700 parts of acetaldehyde. Through a pressure valve there are then introduced 4000 parts of sulfur dioxide. The bomb is heated, while stirring, to 40 to 45° C. of internal temperature. The pressure amounts to 5 to 6 atmospheres. After heating of 30 hours, the reaction is complete. It is advisable to release the viscous sulfur dioxide solution of the reaction product heated to 40° C. from an opening at the lower part of the bomb into cold water. During this operation the sulfur dioxide instantaneously evaporates and can be recovered in a suitable apparatus. The product is precipitated in the water in the form of a fine powder which is filtered by suction, washed and dried under reduced pressure at a temperature of 40° C. to 50° C. The product is free from acid; it is soluble in alcohols, esters, aromatic hydrocarbons and chlorinated hydrocarbons and has otherwise the properties of the acetaldehyde-acetal of polyvinyl alcohol.

(6) 300 parts of polyvinyl alcohol, 360 parts of benzaldehyde and 3 parts of concentrated hydrochloric acid are enclosed into a bomb. 1300 parts of methyl chloride are then introduced through a valve. The bomb is then heated for 30 hours at 40° C., while stirring. The reaction is then complete. The viscous solution is then sprayed through a nozzle into water, the methyl chloride being recovered in a suitable apparatus. The polymeric acetal of the polyvinyl alcohol is precipitated in the form of a fine powder which is washed in water and dried at a raised temperature. The product is completely free from electrolytes.

(7) 400 parts of polyvinyl acetate together with 1000 parts of sulfur dioxide and 250 parts of formaldehyde (of 30 per cent. strength) are homogeneously mixed in an autoclave by stirring for a long time at ordinary temperature. 10 parts of concentrated hydrochloric acid are then introduced and the contents is gradually heated to 40° C. to 50° C. The temperature is maintained until the reaction is complete, this being generally the case after 30 hours and found by taking tests. The mass is released into water, as described in the preceding examples. During this operation the sulfur dioxide escapes and the acetic acid produced is dissolved. The acetic acid together with the hydrochloric acid can be completely eliminated without any difficulty by washing the finely divided white powder.

(8) 450 parts of polyvinyl alcohol and 1000 parts of sulfur dioxide are mixed at −10° C. in a pressure bomb. 170 parts of paraformaldehyde are then introduced, while well stirring. The contents of the bomb is gradually heated to 50° C.

and maintained at this temperature for about 12 hours. After this time the reaction is in most cases complete. The mass has become homogeneous and is released into water through a narrow opening. With formation of much foam, the product is completely disrupted and a loose mass is obtained which after being washed and dried is a white, very loose, completely neutral powder having the properties of the formaldehyde-acetal.

(9) 230 parts of polyvinyl alcohol are charged into a pressure bomb; there are added at a low temperature 600 parts of propane and then 250 parts of isohexylaldehyde and 5 parts of sulfuric acid of 50 per cent. strength. The contents is stirred for about 45 hours at 60° C. After this period the mass has become essentially homogeneous. It is released into a mixture of water and alcohol having a temperature of about −5° C. During this operation the acetal becomes very finely subdivided, whereas the propane escapes in the form of gas. The product is feebly yellow and is worked up in the same manner described in the preceding examples.

I claim:

1. The process which comprises dissolving an acetal of polyvinyl alcohol in a liquid agent which is gaseous at room temperature and atmospheric pressure but liquefiable at room temperature by application of superatmospheric pressures, and then setting free the solvent from the solution.

2. The process which comprises dissolving an acetal of polyvinyl alcohol in a liquid agent which is gaseous at room temperature and atmospheric pressure but liquefiable at room temperature by application of superatmospheric pressures, and then setting free the solvent from the solution by introducing the solution into a precipitating bath for the acetal.

3. The process which comprises dissolving an acetal of polyvinyl alcohol in a liquid agent which is gaseous at room temperature and atmospheric pressure but liquefiable at room temperature by application of superatmospheric pressures, and then setting free the solvent from the solution by introducing the solution into water.

4. The process which comprises dissolving an acetal of polyvinyl alcohol in a pressure vessel in a liquid agent which is gaseous at room temperature and atmospheric pressure but liquefiable at room temperature by application of superatmospheric pressures, and then setting free the solvent from the solution by causing the solution to flow out of the pressure vessel.

5. The process which comprises dissolving an acetal of polyvinyl alcohol in a pressure vessel in liquid sulfur dioxide and then setting free the solvent from the solution.

6. A modification of the process referred to in claim 5 which comprises preparing the acetal of polyvinyl alcohol in a pressure vessel by means of liquid sulfur dioxide as a solvent and then setting free the solvent from the solution.

7. The process which comprises dissolving an acetal of polyvinyl alcohol in a pressure vessel in liquid methyl chloride and then setting free the solvent from the solution.

8. A modification of the process referred to in claim 5 which comprises preparing the acetal of polyvinyl alcohol in a pressure vessel by means of liquid methyl chloride as a solvent and then setting free the solvent from the solution.

9. The process which comprises dissolving an acetal of polyvinyl alcohol in a pressure vessel in liquid dimethyl ether and then setting free the solvent from the solution.

10. A modification of the process referred to in claim 5 which comprises preparing the acetal of polyvinyl alcohol in a pressure vessel by means of liquid dimethyl ether as a solvent and then setting free the solvent from the solution.

11. The process which comprises dissolving an acetal of polyvinyl alcohol in a liquid agent which is gaseous at room temperature and atmospheric pressure but liquefiable at room temperature by application of superatmospheric pressures, and then setting free the solvent from the solution by introducing the solution into a liquid non-solvent for the acetal.

12. The process which comprises dissolving an acetal of polyvinyl alcohol in a pressure vessel in liquid sulfur dioxide and then setting free the solvent from the solution by introducing the solution into water.

13. A modification of the process referred to in claim 5 which comprises preparing the acetal of polyvinyl alcohol in a pressure vessel by means of liquid sulfur dioxide as a solvent and then setting free the solvent from the solution by introducing the solution into water.

14. The process which comprises dissolving an acetal of polyvinyl alcohol in a pressure vessel in liquid methyl chloride and then setting free the solvent from the solution by introducing the solution into water.

15. A modification of the process referred to in claim 5 which comprises preparing the acetal of polyvinyl alcohol in a pressure vessel by means of liquid methyl chloride as a solvent and then setting free the solvent from the solution by introducing the solution into water.

16. The process which comprises dissolving an acetal of polyvinyl alcohol in a pressure vessel in liquid dimethyl ether and then setting free the solvent from the solution by introducing the solution into water.

17. A modification of the process referred to in claim 5 which comprises preparing the acetal of polyvinyl alcohol in a pressure vessel by means of liquid dimethyl ether as a solvent and then setting free the solvent from the solution by introducing the solution into water.

WERNER STARCK.